No. 893,755. PATENTED JULY 21, 1908.
G. N. SAEGMULLER.
MIRROR FOR OPTICAL INSTRUMENTS AND METHOD OF MAKING THE SAME.
APPLICATION FILED MAR. 5, 1908.
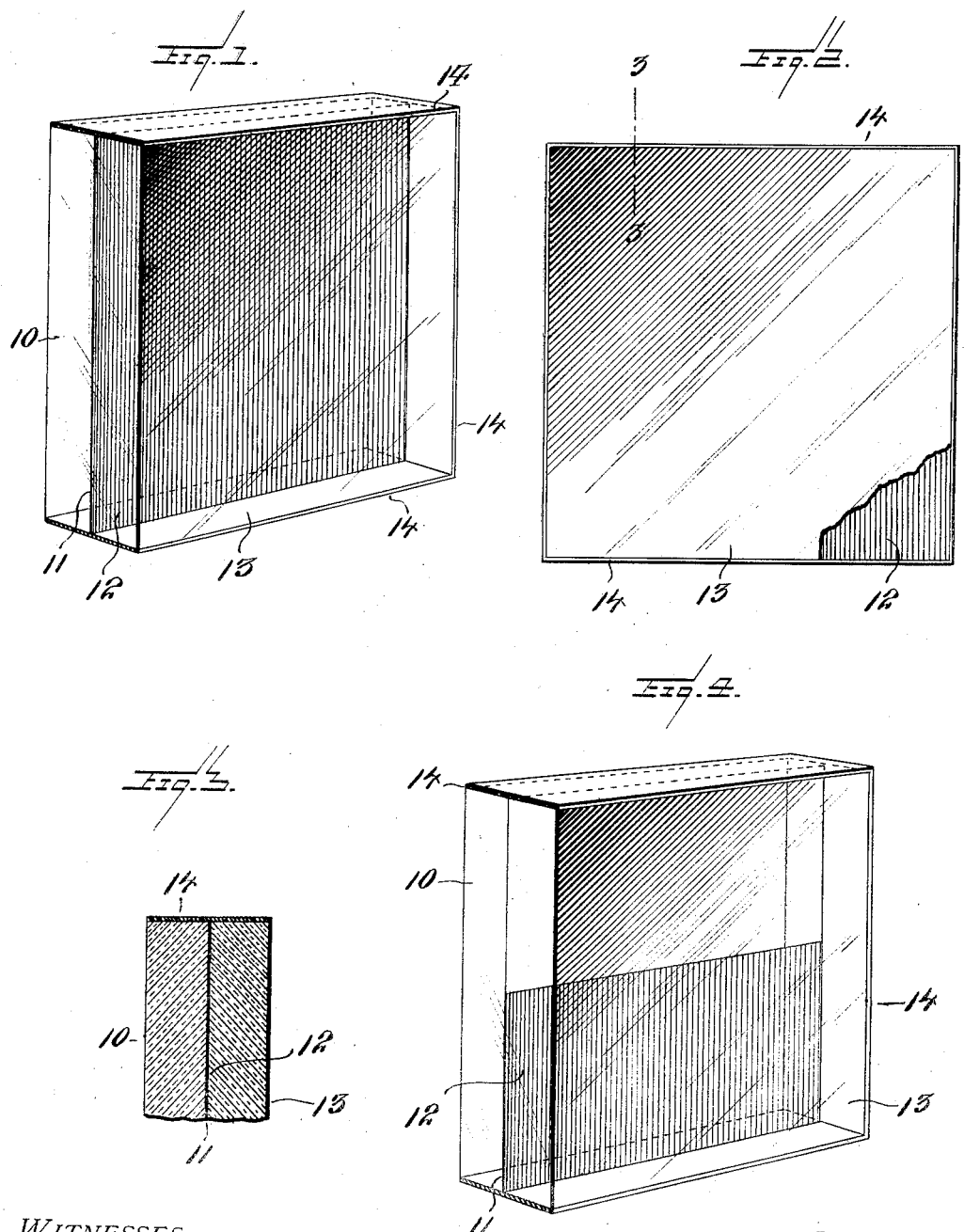
WITNESSES:
INVENTOR
George N. Saegmuller.
BY
Attorney

UNITED STATES PATENT OFFICE.

GEORGE N. SAEGMULLER, OF ROCHESTER, NEW YORK.

MIRROR FOR OPTICAL INSTRUMENTS AND METHOD OF MAKING THE SAME.

No. 893,755.　　　Specification of Letters Patent.　　　Patented July 21, 1908.

Application filed March 5, 1908. Serial No. 419,328.

*To all whom it may concern:*

Be it known that I, GEORGE N. SAEGMULLER, a citizen of the United States, residing at Rochester, county of Monroe, and State of New York, have invented certain new and useful Improvements in Mirrors for Optical Instruments and Methods of Making the Same, of which the following is a specification, reference being had therein to the accompanying drawing.

This invention relates to mirrors for optical instruments and method of making the same, and particularly to a structure whereby the silvered surface is fully protected.

The invention has for an object to provide a method of producing a mirror comprising a silvering material upon a transparent body and polishing the face of said material opposite said body together with a transparent back plate which forms a double mirror capable of use from either side, while the edges of the jointed plates are protected by a moisture proof material to absolutely prevent corrosion or injury of the silvering material.

The invention also has for an object to provide a mirror comprising opposite plates with an intermediate silvering material interposed, said material being reflecting upon its surfaces in contact with each of the plates so that a double or reversible mirror is thereby produced.

Other and further objects and advantages of the invention will be hereinafter fully set forth and the novel features thereof defined by the appended claims.

In the drawing:—Figure 1 is a perspective of the invention with cement removed from one end face. Fig. 2 is an elevation thereof, and Fig. 3 is a detail section on line 3—3, Fig. 2, and Fig. 4 is a perspective of a modified form of the mirror.

Like numerals refer to like parts in the several views of the drawing.

This invention is adapted for any desired use, particularly in connection with optical instruments, it being herein illustrated in connection with an index and horizon mirror for use in a sextant. The form shown in Figs. 1 and 2 comprises an index mirror having an entirely silvered surface, while in Fig. 4 the horizon mirror is shown with only a partial silvered surface, the remainder being transparent as is customary in such instruments.

The numeral 10 designates a transparent plate of any desired size or character, such as glass, to which a silver surface 11 is applied by any well known method. The back surface of this silver surface or its face opposite the transparent plate 10 is polished or finished to provide a reflecting face 12, and this face is protected or covered by a back plate 13 of any desired character. When this base plate is formed of glass, the mirror produced is double or reversible as both surfaces of the silvering reflect through the adjacent material. This plate 13 may be attached in any desired manner, for instance, by the use of well known cements or balsams, and the edges of the joined plates are covered with a moisture proof cement 14, such as dammar, gum, varnish or rubber cement or metallic deposit to prevent any penetration of the moisture into the joint between the assembled plates.

In the form of the invention shown in Fig. 4, the silver surface 11 is only extended upward for a portion of the plates and the upper portion thereof is transparent and of true plane surfaces so as to prevent refraction of the light rays passing therethrough.

In the use of optical instruments, particularly in the presence of salt or moist air the silvering upon the mirrors thereof is quickly dimmed or corroded by such influence and a positive protection required to insure the efficiency of the instrument. By polishing the back or rear face of this silver surface the attack of moisture thereon is more readily repelled as the natural irregularities of the deposited unpolished back of the material are removed and the polished back surface enables a more perfect air tight contact of a backing plate which, when secured in position, gives a positive protection against the entrance of corroding moisture and against condensation of compressed air between the backing plate and the back of the silvered surface by changes in temperature which occurs when this surface is not polished. The edges of these plates are effectually covered by a moisture proof material so that if a transparent back plate be used a double or reversible mirror is produced and the reflecting surface not primarily in use may be brought into use after any deterioration may appear upon the outer surface. The double or reversible mirror is thus adapted to provide a plurality of reflecting surfaces either of which may be used as found desirable or convenient.

In the use of the mirror as a horizon mirror the backing glass is of optical character and the polishing of the back of the silver surface renders such mirror reversible upon the instrument. The invention therefore presents a simple method of producing a mirror and an article which can be economically constructed to produce the most efficient results.

Having described my invention and set forth its merits, what I claim and desire to secure by Letters Patent is:—

1. The method of producing a mirror consisting in silvering a transparent surface, polishing the outer face of said silvering, and applying a transparent back plate to said polished face.

2. The method of producing a mirror consisting in silvering a transparent surface, polishing the back surface of the reflecting material thereon, securing a transparent plate against said polished back, and protecting the joint between said parts by moisture proof material.

3. A mirror comprising opposite plates, and a single intermediate coating of silvering material having reflecting surfaces in contact with each of said plates.

4. A mirror comprising opposite plates, a single intermediate coating of silvering material having reflecting surfaces in contact with each of said plates, and a moisture proof material extended about the edges of said plates and the joint between the same.

In testimony whereof I affix my signature in presence of two witnesses.

GEORGE N. SAEGMULLER.

Witnesses:
W. V. KEIL,
J. A. PELSINGER.